(12) United States Patent
Williams et al.

(10) Patent No.: US 7,085,681 B1
(45) Date of Patent: Aug. 1, 2006

(54) SYMBIOTIC INTERRUPT/POLLING APPROACH FOR MONITORING PHYSICAL SENSORS

(75) Inventors: Emrys J. Williams, Palo Alto, CA (US); Kenneth C. Gross, San Diego, CA (US)

(73) Assignee: SUN Microsystems, Inc., Santa Clara, CA (US)

( * ) Notice: Subject to any disclaimer, the term of this patent is extended or adjusted under 35 U.S.C. 154(b) by 0 days.

(21) Appl. No.: 11/021,145

(22) Filed: Dec. 22, 2004

(51) Int. Cl.
- *G06F 11/30* (2006.01)
- *G06F 15/00* (2006.01)
- *G21C 17/00* (2006.01)

(52) U.S. Cl. .................................... 702/183
(58) Field of Classification Search ............... 702/104, 702/116, 182–185, 187–189
See application file for complete search history.

(56) References Cited

U.S. PATENT DOCUMENTS

| | | | |
|---|---|---|---|
| 4,937,763 A | 6/1990 | Mott | 364/550 |
| 2004/0113783 A1* | 6/2004 | Yagesh | 340/568.1 |
| 2004/0153686 A1* | 8/2004 | Gilstrap et al. | 714/1 |

* cited by examiner

*Primary Examiner*—Michael Nghiem
(74) *Attorney, Agent, or Firm*—Park, Vaughan & Fleming LLP; Edward J. Grundler

(57) ABSTRACT

One embodiment of the present invention provides a system that monitors a computer system using a plurality of physical sensors. The system operates by polling the plurality of physical sensors in a given sequence at a given rate, wherein each physical sensor monitors a specific physical parameter of the computer system. The system then provides a plurality of measurements from the plurality of physical sensors to a monitoring system. If a given physical sensor detects a parameter that is not within a pre-determined operating range, the system receives an interrupt from the given physical sensor. In response to receiving this interrupt, the system raises an alarm.

18 Claims, 4 Drawing Sheets

SYMBIOTIC INTERRUPT/POLLING APPROACH FOR MONITORING PHYSICAL SENSORS

BACKGROUND

The present invention relates to techniques for monitoring computer systems.

As electronic commerce grows increasingly more prevalent, businesses are increasingly relying on enterprise computing systems to process ever-larger volumes of electronic transactions. A failure in one of these enterprise computing systems can be disastrous, potentially resulting in millions of dollars of lost business. More importantly, a failure can seriously undermine consumer confidence in a business, making customers less likely to purchase goods and services from the business. Hence, it is critically important to ensure high availability in such enterprise computing systems.

To achieve high availability in enterprise computing systems it is necessary to be able to capture unambiguous diagnostic information that can quickly pinpoint the source of defects in hardware or software. Some high-end servers, which cost over a million dollars each, contain hundreds (or even thousands) of physical sensors that measure temperatures, voltages and currents throughout the system.

These physical sensors are typically monitored through either polling or interrupts. In systems that monitor sensors through polling, the value of a physical parameter monitored by the sensor is queried (polled) by software at some preset (typically adjustable) sampling interval. Note that polling creates time series values for each polled sensor.

In systems that use interrupts to monitor sensors, a value for a monitored parameter reported by the sensor only if the value triggers an upper or lower threshold value (also called a latch limit, or latch threshold).

An advantage of interrupt-driven sensors is that there is continuous assurance that the physical parameter being monitored by the sensor is within its specified operation bounds (as long as the sensor is still working). Note that in polled sensors, there are gaps between observations, and it is possible for the physical variable being monitored to stray outside of the operational bounds during these gaps. Although one could reduce the size of these gaps by sampling at a higher frequency, doing so consumes additional bandwidth on the service bus. This can cause bandwidth problems on the service bus if hundreds or thousands of sensors are being polled through a sequential polling process. Note that if many sensors are being polled, and each polling operation takes a fixed amount of time, there is an upper limit to the number of sensors that can be polled at a given sampling rate.

FIG. 1 illustrates a measured parameter 102 versus time 104 for an interrupt-driven monitoring system. An interrupt-driven monitoring system typically has an upper limit 106 and/or a lower limit 108 for the measured parameter. As illustrated in FIG. 1, measured parameter 102 varies with time and is normally between upper limit 106 and lower limit 108.

If measured parameter 102 falls below lower limit 108, the physical sensor measuring measured parameter 102 generates interrupt 110. Likewise, if measured parameter 102 exceeds upper limit 106, the physical sensor generates interrupt 112. Note that interrupts 110 and 112 can be generated only once, as the value of measured parameter 102 crosses the lower limit 108 and upper limit 106, respectively. Alternatively interrupts 110 and 112 can be generated continuously while measured parameter 102 is out-of-bounds, or they can be generated only at the transition points where measured parameter 102 goes out-of-bounds and in-bounds.

FIG. 2 illustrates a measured parameter 102 versus time 104 in the case of a sensor failure in an interrupt-driven monitoring system. In this example, when the physical sensor fails at 202, the value reported by the physical sensor is stuck between upper limit 106 and lower limit 108. In this situation, no interrupts are generated and the failed sensor is not reported. Furthermore, if the measured parameter 102 actually passes upper limit 106 or lower limit 108 after this sensor failure, no interrupts are generated.

FIG. 3 illustrates a measured parameter 302 versus time 304 in a polled system. Note that in the polled system, no upper limit or lower limit is monitored by the physical sensor. Instead, the value of measured parameter 302 is read periodically (at polling points 306) and these parameter values are forwarded to an analysis system to determine if measured parameter 302 is out-of-bounds. Note that since polling is a sequential process, the polling frequency may be limited by the number of sensors within the system. For example, suppose a system includes a thousand sensors and each polling operation for a given sensor takes 3.5 milliseconds. If this system polls all of the thousand sensors sequentially, the time interval between consecutive polling operations for a given sensor is at least 3.5 seconds. Consequently, it is possible that an out-of-bounds parameter will not be recognized for up to 3.5 seconds. This 3.5 second delay in taking evasive action can potentially lead to a catastrophic failure, which may have been averted if the out-of bounds signal had been detected sooner.

An advantage of polling over interrupt-driven sensors is that there is a wealth of diagnostic/prognostic information contained in the values gathered during the polling process, even when the values are safely between their threshold limits. For example, using values obtained during the polling process, it is possible to infer correlations between signals. By monitoring these correlations, it is possible to detect system anomalies even when measured parameters are not out-of-bounds. This can provide an earlier and more sensitive indication of a possible incipient problem. Secondly, if a sensor fails in such a manner that it keeps its last mean value, but is no longer responding to the variable it is monitoring, applying simple pattern recognition algorithms to the polled responses can easily catch this failure.

SUMMARY

One embodiment of the present invention provides a system that monitors a computer system using a plurality of physical sensors. The system operates by polling the plurality of physical sensors in a given sequence at a given rate, wherein each physical sensor monitors a specific physical parameter of the computer system. The system then provides a plurality of measurements from the plurality of physical sensors to a monitoring system. If a given physical sensor detects a parameter that is not within a pre-determined operating range, the system receives an interrupt from the given physical sensor. In response to receiving this interrupt, the system raises an alarm.

In a variation of this embodiment, the system analyzes the plurality of measurements to generate diagnostics, and possibly alarms, related to the plurality of measurements.

In a further variation, while analyzing the plurality of measurements, the system first examines a time history of measurements from each sensor in the plurality of physical sensors. The system then determines if the time history of measurements for any sensor is indicative of a trend toward a failure. If the time history of measurements for any is indicative of a trend toward a failure, the system raises an alarm.

In a further variation, analyzing the plurality of measurements involves correlating a time history of measurements from each sensor with the time history of measurements from other sensors. The system then determines if the correlations indicate a trend toward a failure. If so, the system raises an alarm.

In a further variation, if multiple interrupt signals are received within a given time period, the system performs diagnostic analysis of the multiple interrupt signals to determine if there is a common cause for the multiple interrupt signals.

In a further variation, sensors within the plurality of physical sensors are configured to measure temperature, current, or voltage.

In a further variation, the computer system is an enterprise computer server.

In a further variation, the physical sensor responds to a polling signal with a current measurement of a monitored parameter. If the monitored parameter is not within a given range, the physical sensor generates an interrupt.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices, such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as a LAN, a WAN, or the Internet.

Computer Systems

Figure 1:
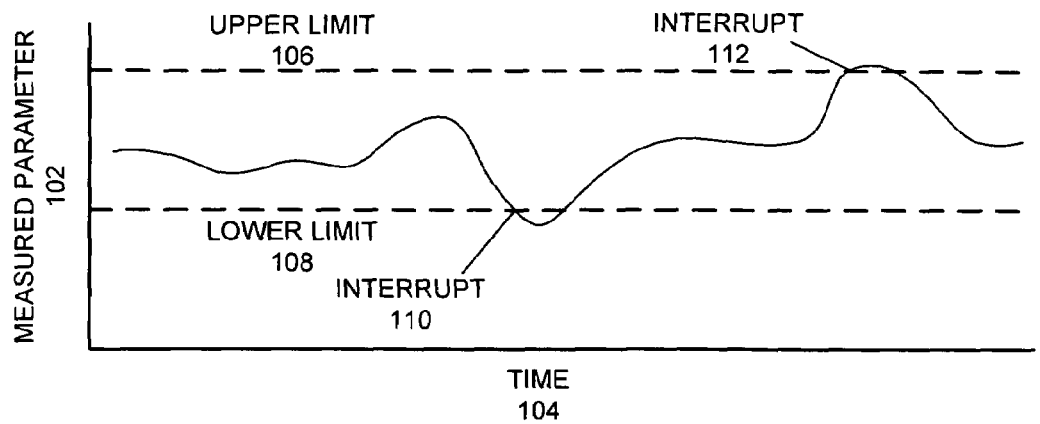
FIG. 1 illustrates a measured parameter versus time in an interrupt-driven monitoring system.
Figure 2:
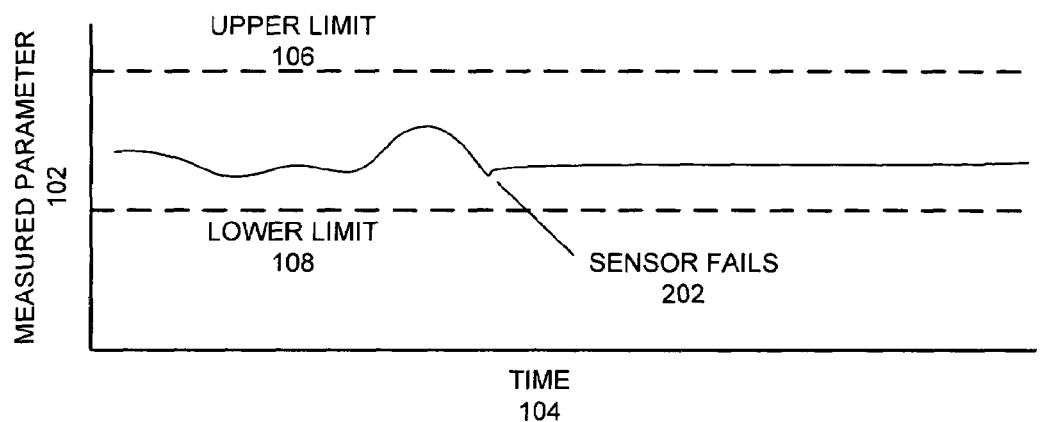
FIG. 2 illustrates a measured parameter versus time where there is a sensor failure in an interrupt-driven monitoring system.
Figure 3:
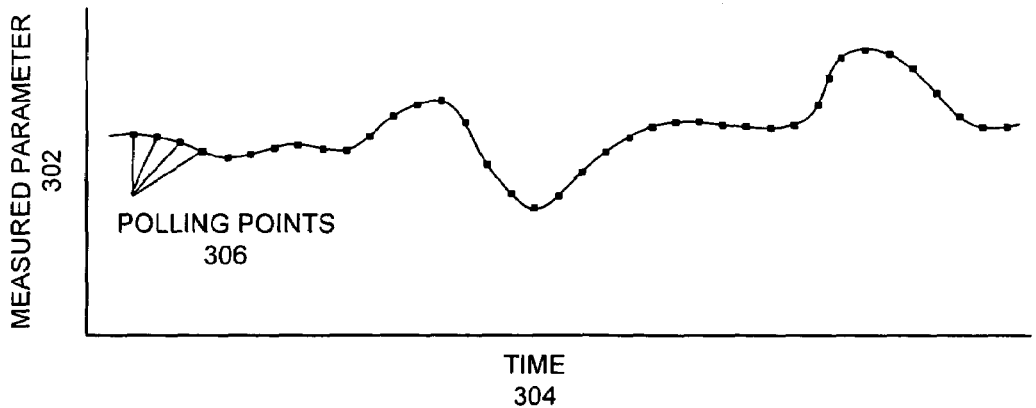
FIG. 3 illustrates a measured parameter versus time in a polled monitoring system.
Figure 4:
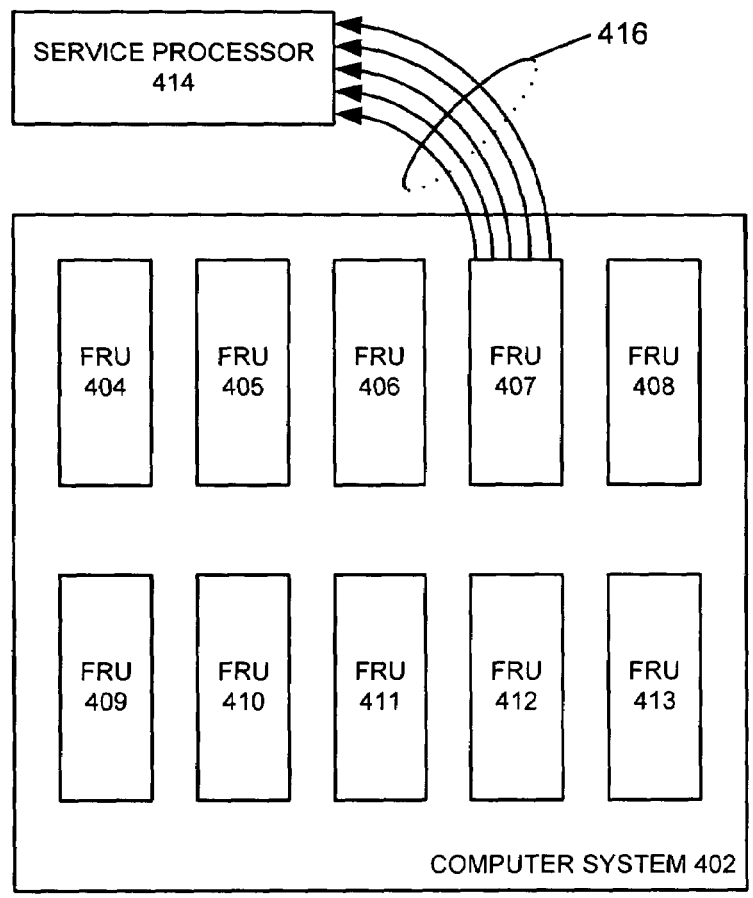
FIG. 4 illustrates a computer system coupled to a service processor in accordance with an embodiment of the present invention.

FIG. 4 illustrates a computer system 402 coupled to a service processor 414 in accordance with an embodiment of the present invention. Computer system 402 and service processor 414 generally include any type of computer system, including, but not limited to, a computer system based on a microprocessor, a mainframe computer, a digital signal processor, a portable computing device, a personal organizer, a device controller, and a computational engine within an appliance. Service processor 414 can be an independent computer system, a field replaceable unit within computer system 402 or may be incorporated as a computing system located on a field replaceable unit within computer system 402 but separate from computer system 402.

Computer system 402 includes several field replaceable units-FRUs 404–413. FRUs 404–413 include components that make up computer system 402, such as a system board, a power supply, memory boards, and I/O interface boards. FRUs 404–413 provide polling responses and interrupt signals 416 to service processor 414 from the various physical sensors on the FRU. Note that each FRU provides these signals to service processor 414. However, in order to avoid complicating FIG. 4, only the polling response and interrupt signals from FRU 407 are shown.

Service Processor

Figure 5:
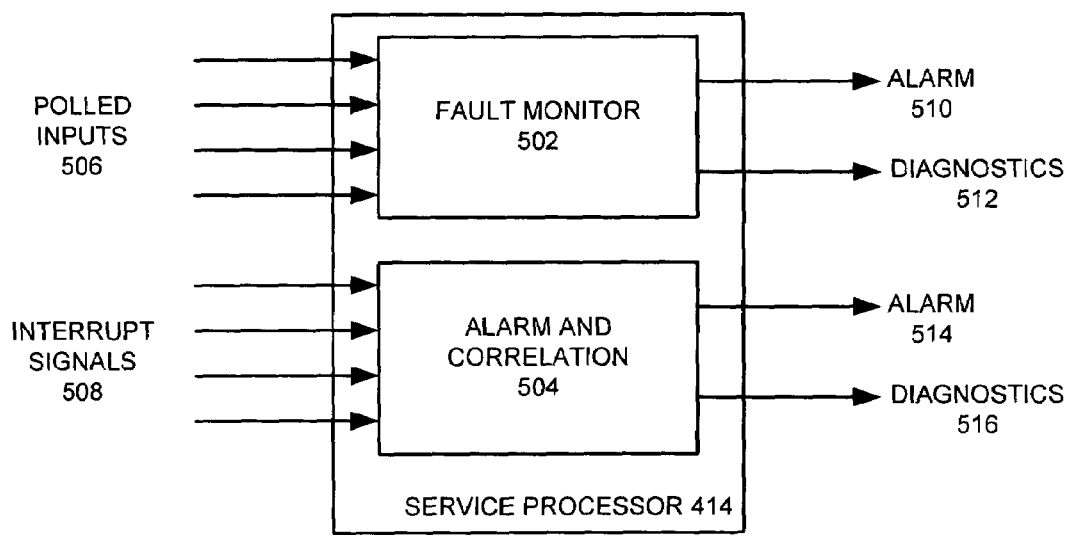
FIG. 5 illustrates a service processor in accordance with an embodiment of the present invention.

FIG. 5 illustrates a service processor 414 in accordance with an embodiment of the present invention. Service processor 414 includes fault monitor 502 and alarm and correlation unit 504. Note that fault monitor 502 and alarm and correlation unit 504 can be implemented as separate units outside of service processor 414.

Fault monitor 502 receives polled inputs 506 from the various sensors located on FRUs 404–413 within computer system 402. During operation, fault monitor 502 performs various operations and correlations on the polled inputs 506 received from the polled sensors. These operations can generate an alarm 510 indicating a failure within computer system 402, and can generate diagnostics 512, which can indicate an impending failure within computer system 402. Diagnostics 512 can also include information concerning failed sensors within computer system 402.

Alarm and correlation unit 504 receives interrupt signals 508 from the various sensors within computer system 402 when a monitored parameter is out-of-bounds. In response to an interrupt, alarm and correlation unit 504 generates alarm 514. Additionally, alarm and correlation unit 504 can provide diagnostics 516 indicating correlations among two or more interrupt signals 508 received at the same time to determine a common cause for multiple interrupt signals 508. For example, multiple temperature sensors that simultaneously generate interrupt signals 508 because their monitored temperatures are too high could possibly be caused by a single defective fan.

Polling Physical Sensors

Figure 6:
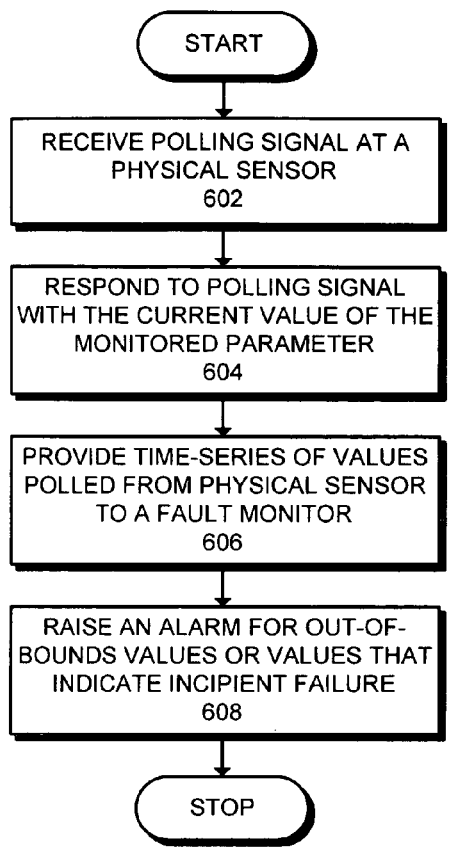
FIG. 6 presents a flowchart illustrating the process of polling in accordance with an embodiment of the present invention.

FIG. 6 presents a flowchart illustrating the process of polling in accordance with an embodiment of the present invention. The system starts when a physical sensor receives a polling signal (step 602). Next, the physical sensor responds with the current value of the monitored parameter (step 604). The system then generates a time-series of values for each monitored sensor and provides these time-series of values to a fault monitor (step 606). The fault monitor raises an alarm for out-of-bounds vales or values that indicate an incipient failure within the system (step 608).

Note that the fault monitor can correlate among the various time-series of values to detect incipient failures. Note also that the fault monitor can detect a physical sensor that has failed but is responding with in in-bounds value. Note that a physical sensor in accordance with the present invention can both respond to polling signals and can generate interrupt signals as is described below with reference to FIGS. 7 and 8.

Interrupts from Physical Sensors

Figure 7:
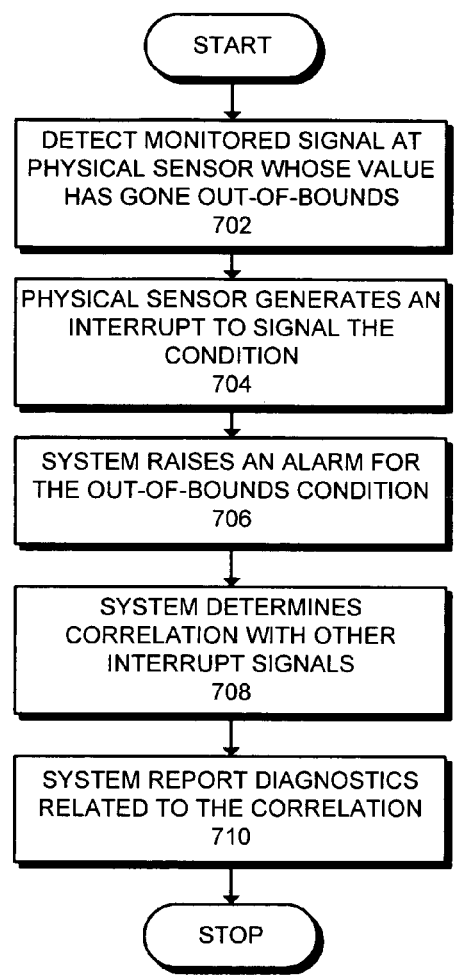
FIG. 7 presents a flowchart illustrating the process of reporting out-of-bound values in an interrupt-driven monitoring system in accordance with an embodiment of the present invention.

FIG. 7 presents a flowchart illustrating the process of reporting out-of-bound values in an interrupt-driven system in accordance with an embodiment of the present invention. The system starts when a physical sensor detects that the value of a monitored signal has gone out-of-bounds (step 702). In response, the physical sensor generates an interrupt to signal the condition (step 704). Next, the system raises an alarm for the out-of-bounds condition (step 706). The system then detects correlations with other interrupt signals (step 708). If there is a correlation with other interrupt signals, the system reports diagnostics related to the correlation (step 710).

Physical Sensor

Figure 8:
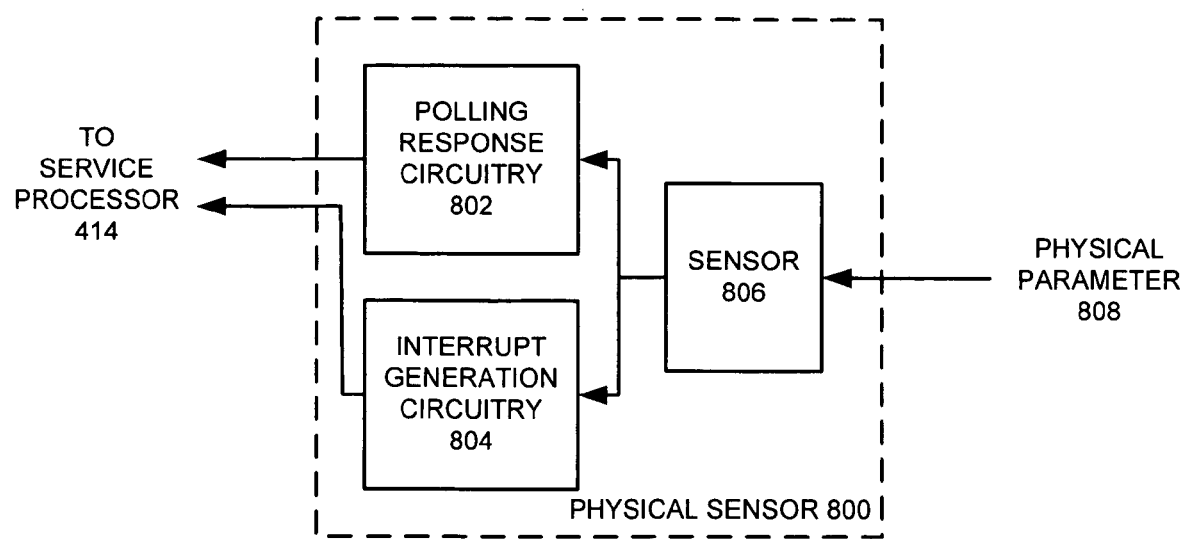
FIG. 8 illustrates a physical sensor in accordance with an embodiment of the present invention.

FIG. 8 illustrates a physical sensor 800 in accordance with an embodiment of the present invention. Physical sensor 800 includes sensor 806, polling response circuitry 802, and interrupt generation circuitry 804.

During operation, sensor 806 monitors physical parameter 808 and provides the value of physical parameter 808 to polling response circuitry 802 and interrupt generation circuitry 804. In response to a polling signal, polling response circuitry 802 provides this value to service processor 414.

Simultaneously, interrupt generation circuitry 804 monitors the measured value of physical parameter 808 and compares this measured value to upper and lower limits. Note that these limits can be designed into physical sensor 800 or can be dynamically set by signals received from the system. If the value of physical parameter 808 goes out-of-bounds with respect to these limits, interrupt generation circuitry 804 generates an interrupt to service processor 414.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for monitoring a system with a plurality of physical sensors, comprising:
    polling the plurality of physical sensors in a given sequence at a given rate, wherein each physical sensor monitors a specific physical parameter of the system;
    providing a plurality of measurements to a monitoring system, wherein each measurement originates from one of the plurality of physical sensors;
    if a given physical sensor detects a parameter that is not within a pre-determined operating range, receiving an interrupt from the physical sensor; and
    in response to receiving the interrupt, raising an alarm;
    determining if multiple interrupt signals are received within a given time period; and
    if so, analyzing the multiple interrupt signals to determine if there is a common cause for the multiple interrupt signals.

2. The method of claim 1, further comprising analyzing the plurality of measurements to generate alarms and diagnostics related to the plurality of measurements.

3. The method of claim 2, wherein analyzing the plurality of measurements involves:
    examining a time history of measurements from each sensor in the plurality of physical sensors;
    determining if the time history of measurements for any sensor indicates a trend toward a failure; and
    if so, raising an alarm.

4. The method of claim 2, wherein analyzing the plurality of measurements involves:
    correlating a time history of measurements from each sensor with the time history of measurements from other sensors;
    determining if the correlations indicate a trend toward a failure; and
    if so, raising an alarm.

5. The method of claim 1, wherein sensors within the plurality of physical sensors are configured to measure temperature, current, and voltage.

6. The method of claim 1, wherein the system is an enterprise computer server.

7. The method of claim 1, further comprising:
    responding to a polling signal from a given physical sensor with a current measurement of a monitored parameter; and
    if the monitored parameter is not within a given range, generating an interrupt from the physical given sensor.

8. A computer-readable storage medium storing instructions that when executed by a computer cause the computer to perform a method for monitoring a system with a plurality of physical sensors, the method comprising
    polling the plurality of physical sensors in a given sequence at a given rate, wherein each physical sensor monitors a specific physical parameter of the system;
    providing a plurality of measurements to a monitoring system, wherein each measurement originates from one of the plurality of physical sensors;
    if a given physical sensor detects a parameter that is not within a pre-determined operating range, receiving an interrupt from the physical sensor; and
    in response to receiving the interrupt, raising an alarm;
    determining if multiple interrupt signals are received within a given time period; and
    if so, analyzing the multiple interrupt signals to determine if there is a common cause for the multiple interrupt signals.

9. The computer-readable storage medium of claim 8, the method further comprising analyzing the plurality of measurements to generate alarms and diagnostics related to the plurality of measurements.

10. The computer-readable storage medium of claim 9, wherein analyzing the plurality of measurements involves:
    examining a time history of measurements from each sensor in the plurality of physical sensors;
    determining if the time history of measurements for any sensor indicates a trend toward a failure; and
    if so, raising an alarm.

11. The computer-readable storage medium of claim 9, wherein analyzing the plurality of measurements involves:

correlating a time history of measurements from each sensor with the time history of measurements from other sensors;

determining if the correlations indicate a trend toward a failure; and if so, raising an alarm.

12. The computer-readable storage medium of claim 8, wherein sensors within the plurality of physical sensors are configured to measure temperature, current, and voltage.

13. The computer-readable storage medium of claim 8, wherein the system is an enterprise computer server.

14. The computer-readable storage medium of claim 8, the method further comprising:

responding to a polling signal from a given physical sensor with a current measurement of a monitored parameter; and if the monitored parameter is not within a given range, generating an interrupt from the physical given sensor.

15. An apparatus for monitoring a system with a plurality of physical sensors, comprising a polling mechanism configured to poll the plurality of physical sensors in a given sequence at a given rate, wherein each physical sensor monitors a specific physical parameter of the system;

a responding mechanism configured to provide a plurality of measurements to a monitoring system, wherein each measurement originates from one of the plurality of physical sensors;

a receiving mechanism configured to receive an interrupt from a sensor associated with the parameter that is not within a pre-determined operating range; and an alarm mechanism configured to raise an alarm in response to receiving the interrupt;

a determining mechanism configured to determine if multiple interrupt signals are received within a given time period; and an analyzing mechanism configured to analyze the multiple interrupt signals to determine if there is a common cause for the multiple interrupt signals.

16. The apparatus of claim 15, further comprising an analyzing mechanism configured to analyze the plurality of measurements to generate alarms and diagnostics related to the plurality of measurements.

17. The apparatus of claim 16, further comprising:

an examining mechanism configured to examine a time history of measurements from each sensor in the plurality of physical sensors; and a determining mechanism configured to determine if the time history of measurements for any sensor indicates a trend toward a failure;

wherein the alarm mechanism is further configured to raise an alarm if the time history of measurements for any sensor indicates the trend toward a failure.

18. The apparatus of claim 16, further comprising:

a correlating mechanism configured to correlate a time history of measurements from each sensor with the time history of measurements from other sensors; and a determining mechanism configured to determine if the correlations indicate a trend toward a failure;

wherein the alarm mechanism is further configured to raise an alarm if the correlations indicate the trend toward a failure.

* * * * *

UNITED STATES PATENT AND TRADEMARK OFFICE
CERTIFICATE OF CORRECTION

| | |
|---|---|
| PATENT NO. | : 7,085,681 B1 |
| APPLICATION NO. | : 11/021145 |
| DATED | : August 1, 2006 |
| INVENTOR(S) | : Emrys J. Williams et al. |

It is certified that error appears in the above-identified patent and that said Letters Patent is hereby corrected as shown below:

Title page, Item [75] should read:  --Emrys J. Williams, Milton Keynes, UNITED KINGDOM--

Signed and Sealed this

Third Day of October, 2006

JON W. DUDAS
*Director of the United States Patent and Trademark Office*